United States Patent
Bala et al.

(10) Patent No.: US 9,098,749 B2
(45) Date of Patent: Aug. 4, 2015

(54) DICTIONARY DESIGN FOR COMPUTATIONALLY EFFICIENT VIDEO ANOMALY DETECTION VIA SPARSE RECONSTRUCTION TECHNIQUES

(71) Applicant: Xerox Corporation, Norwalk, CT (US)

(72) Inventors: Raja Bala, Pittsford, NY (US); Zhigang Fan, Webster, NY (US); Aaron Michael Burry, Ontario, NY (US); Jose Antonio Rodriguez-Serrano, Grenoble (FR); Vishal Monga, State College, PA (US); Xuan Mo, State College, PA (US)

(73) Assignee: Xerox Corporation, Norwalk, CT (US)

( * ) Notice: Subject to any disclaimer, the term of this patent is extended or adjusted under 35 U.S.C. 154(b) by 299 days.

(21) Appl. No.: 13/827,222

(22) Filed: Mar. 14, 2013

(65) Prior Publication Data
US 2014/0270353 A1    Sep. 18, 2014

(51) Int. Cl.
*G06K 9/00* (2006.01)
*G06K 9/62* (2006.01)

(52) U.S. Cl.
CPC .......... *G06K 9/00771* (2013.01); *G06K 9/6249* (2013.01)

(58) Field of Classification Search
None
See application file for complete search history.

(56) References Cited

U.S. PATENT DOCUMENTS

| 7,852,370 | B2 | 12/2010 | Peleg et al. | |
|---|---|---|---|---|
| 2005/0094994 | A1 | 5/2005 | Paolantonio et al. | |
| 2006/0109341 | A1* | 5/2006 | Evans | 348/14.08 |
| 2007/0028219 | A1 | 2/2007 | Miller et al. | |
| 2008/0031491 | A1* | 2/2008 | Ma et al. | 382/103 |
| 2008/0170623 | A1* | 7/2008 | Aharon et al. | 375/240.22 |
| 2010/0040296 | A1* | 2/2010 | Ma et al. | 382/225 |
| 2011/0044499 | A1 | 2/2011 | Cobb et al. | |
| 2011/0081082 | A1* | 4/2011 | Jiang et al. | 382/170 |
| 2011/0153236 | A1 | 6/2011 | Montreuil et al. | |
| 2011/0188757 | A1* | 8/2011 | Chan et al. | 382/190 |
| 2012/0063641 | A1 | 3/2012 | Venkatesh et al. | |
| 2012/0063689 | A1* | 3/2012 | Tran et al. | 382/224 |
| 2012/0237081 | A1 | 9/2012 | Datta et al. | |
| 2012/0278021 | A1 | 11/2012 | Lin et al. | |
| 2013/0236090 | A1* | 9/2013 | Porikli et al. | 382/155 |
| 2013/0286208 | A1* | 10/2013 | Bala et al. | 348/149 |

(Continued)

OTHER PUBLICATIONS

"Online Detection of Unusual Events in Videos via Dynamic Sparse Coding," Bin Zhao, et al, 2011 IEEE Conference on Computer Vision and Pattern Recognition (CVPR), 2011, pp. 3313-3320.*

(Continued)

*Primary Examiner* — Wenpeng Chen
(74) *Attorney, Agent, or Firm* — Kermit D. Lopez; Luis M. Ortiz; Ortiz & Lopez, PLLC

(57) ABSTRACT

Methods, systems, and processor-readable media for pruning a training dictionary for use in detecting anomalous events from surveillance video. Training samples can be received, which correspond to normal events. A dictionary can then be constructed, which includes two or more classes of normal events from the training samples. Sparse codes are then generated for selected training samples with respect to the dictionary derived from the two or more classes of normal events. The size of the dictionary can then be reduced by removing redundant dictionary columns from the dictionary via analysis of the sparse codes. The dictionary is then optimized to yield a low reconstruction error and a high-interclass discriminability.

20 Claims, 7 Drawing Sheets

(56) References Cited

U.S. PATENT DOCUMENTS

2014/0172764 A1* 6/2014 Ni et al. ............... 706/46
2014/0232862 A1* 8/2014 Bala et al. ............. 348/143

OTHER PUBLICATIONS

"Multi-observation Visual Recognition via Joint Dynamic Sparse Representation," Haichao Zhang, et al, 2011 IEEE International Conference on Computer Vision, 2011, pp. 595-602.*

"Classification and Clustering via Dictionary Learning with Structured Incoherence and Shared Features," Ignacio Ramirez et al, 2010 IEEE Conference on Computer Vision and Pattern Recognition (CVPR), Jun. 13-18, 2010, pp. 3501-3508.*

"Sparse Reconstruction Cost for Abnormal Event Detection," Yang Cong et al, 2011 IEEE Conference on Computer Vision and Pattern Recognition (CVPR), Jun. 20-25, 2011, pp. 3449-3456.*

"Practical Methods for Sparsity Based Video Anomaly Detection," Mo et al, Proceedings of the 16th International IEEE Annual Conference on Intelligent Transportation Systems (ITSC 2013), The Hague, The Netherlands, Oct. 6-9, 2013, pp. 955-960.*

U.S. Appl. No. 13/476,239, May 21, 2012, Bala et al.

Fu, Z. et al., "Similarity Based Vehicle Trajectory Clustering and Anomaly Detection," IEEE International Conference on Image Processing, 2005 (ICIP'05), vol. 2, pp. 602-605.

Hu, W. et al., "A Survey on Visual Surveillance of Object Motion and Behaviors," IEEE Transactions on Systems, Man, and Cybernetics—Part C: Applications and Reviews (2004) :34(3):334-352.

Jebara, T. et al., "Spectral Clustering and Embedding with Hidden Markov Models," ECML '07 Proceedings of the 18th European conference on Machine Learning (2007), pp. 164-175, Springer-Verlag, Berlin, Heidelberg.

Junejo, I. N. et al., "Multi Feature Path Modeling for Video Surveillance," Proc. IEEE Int. Conf. Pattern Recognition, vol. 2, pp. 716-719, Aug. 2004.

Kreutz-Delgado, K. et al., "Dictionary Learning Algorithms for Sparse Representation," Neural Computation (2003) 15:349-396.

Li, C. et al., "Abnormal Behavior Detection via Sparse Reconstruction Analysis of Trajectory," 2011 Sixth International Conference on Image and Graphics, pp. 807-810.

Morris, B. et al., "Learning Trajectory Patterns by Clustering: Experimental Studies and Comparative Evaluation," in Proc. IEEE Int. Conf. Computer Vision and Pattern Recognition, pp. 312-319, Jun. 20-25, 2009.

Ng, A. Y et al., "On Spectral Clustering: Analysis and an algorithm," Advances in Neural Information Processing Systems (2001) pp. 849-856.

Piciarelli, C. et al., "Trajectory-Based Anomalous Event Detection" IEEE Transactions on Circuits and Systems for Video Technology (2008) 18(11):1544-1554.

Rodriguez, F. et al., "Sparse Representations for Image Classification: Learning Discriminative and Reconstructive Non-Parametric Dictionaries," Institute for Mathematics and its Applications (2008) University of Minnesota, June, IMA Reprint Series +2213, 15 pages.

Rodriguez-Serrano, J. A. et al., "Trajectory clustering in CCTV traffic videos using probability product kernels with hidden Markov models," Pattern Anal. Applic. (2012) 15:415-426.

Rodriguez-Serrano, J. A., "A Model-Based Sequence Similarity with Application to Handwritten Word Spotting," IEEE Transactions on Pattern Analysis and Machine Intelligence (2012) 34(11):2108-2120.

Saligrama, V. et al., "Video Anomaly Identification a statistical approach," IEEE Signal Processing Magazine (2010) pp. 18-33.

Wright, J. et al., "Robust Face Recognition via Sparse Representation" IEEE Transactions on Pattern Analysis and Machine Intelligence (2009)31(2):210-227.

Yilmaz, A. et al., "Object Tracking: A Survey," ACM Computing Surveys (2006) 38(4), 45 pages.

* cited by examiner

DICTIONARY DESIGN FOR COMPUTATIONALLY EFFICIENT VIDEO ANOMALY DETECTION VIA SPARSE RECONSTRUCTION TECHNIQUES

FIELD OF THE INVENTION

Embodiments are generally related to image-processing methods and systems Embodiments are further related to video-based surveillance methods and systems. Embodiments are additionally related to video-based anomaly detection.

BACKGROUND

With the increasing demand for security and safety, video-based surveillance systems are being increasingly implemented in urban locations. Vast amounts of video footage are collected and analyzed for traffic violations, accidents, crime, terrorism, vandalism, and other suspicious activities. Since manual analysis of such large volumes of data is prohibitively costly, there is a desire to develop effective algorithms that can aid in the automatic or semi-automatic interpretation and analysis of video data for surveillance and law enforcement. An active area of research within this domain is video anomaly detection, which refers to the problem of finding patterns in data that do not conform to expected behavior, and that may warrant special attention or action.

Video-based AD (Anomaly Detection) has received much recent attention. One class of techniques relies upon object tracking to detect nominal object trajectories and deviations thereof. This approach is appealing for traffic-related anomalies since there are many state-of-the-art tracking techniques that can be leveraged. A common approach involves derivation of nominal vehicle paths and identification of deviations thereof in, for example, live traffic video data. During a test or evaluation phase, a vehicle can be tracked and its path compared against the nominal classes. A statistically significant deviation from all classes indicates an anomalous path.

Primary challenges in AD include, but are not limited to: i) successful detection of abnormal patterns in realistic scenarios involving multiple object trajectories in the presence of occlusions, clutter, and other background noise; ii) development of algorithms that are computationally simple enough to detect anomalies in quasi-real-time; and iii) the lack of sufficient and standardized data sets, particularly those capturing anomalous events which are rare by definition.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the disclosed embodiments to provide for improved image-processing methods, systems, and processor-readable media.

It is another aspect of the disclosed embodiments to provide for improved video-based surveillance methods, systems, and processor-readable media.

It is still another aspect of the disclosed embodiments to provided for video-based anomaly detection via sparse reconstruction techniques.

The aforementioned aspects and other objectives and advantages can now be achieved as described herein. Methods, systems, and processor-readable media for pruning a training dictionary for use in detecting anomalous events from surveillance video are disclosed. Training samples can be received, which correspond to normal events. A dictionary can then be constructed, which includes two or more classes of normal events from the training samples. Sparse codes are then generated for selected training samples with respect to the dictionary derived from the two or more classes of normal events. The size of the dictionary can then be reduced by removing redundant dictionary columns from the dictionary via analysis of the sparse codes. The dictionary is then optimized to yield a low reconstruction error and a high-interclass discriminability.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The disclosed embodiments are aimed at detecting anomalies or unusual patterns in video footage in the transportation domain (e.g. traffic violations, accidents, unsafe driver behavior, street crime, and other suspicious activities). It can be appreciated, of course, that such embodiments can be implemented to detect anomalies or unusual patterns in viodel footage in other domains (e.g., secure facilities, factories, etc).

Figure 1:
FIG. 1 illustrates example images of transportation related anomalies, which can be detected according to the disclosed embodiments.

FIG. 1, for example, illustrates example video footage 10, 12, 14, and 16 of transportation related anomalies that can be detected via the embodiments discussed in greater detail below. Examples of traffic-related anomalies include, for example, video footage 10—unattended baggage; video footage 12—a car approaching a pedestrian (see area 13); video footage 14—a car crossing double solid lines; and video footage 16—a car running a red light.

The disclosed approach is constructed upon a mathematical framework referred to as sparse reconstruction, which in turn requires the existence of a dictionary comprising classes of normal events. The success of the sparsity-based approach relies upon a dictionary with good inter-class separation, which is not guaranteed especially in complex traffic scenarios. After using a discriminative dictionary learning technique, we can retain very few of the training examples in the dictionary without losing much useful information. Therefore, the computational complexity will be reduced tremendously. Embodiments can be implemented in a video-based traffic surveillance system, for example, as a means of detecting and flagging unusual activities at a transportation site such as a traffic intersection, parking lot, or highway.

Techniques based on sparse reconstruction can be applied towards the problem of image classification and subsequently for trajectory-based anomaly detection. The basic idea is as follows. In a training step, normal or usual events in the video footage are extracted and categorized into a set of nominal event classes. The categorization is based on a set of n-dimensional feature vectors extracted from the video data and can be performed manually or automatically. Parametric representations of vehicle trajectories can be selected as the features. Note that the representation of a trajectory goes beyond the sequence of image or ground-plane coordinates and could encompass other measurements such as velocity, or other quantities outputted by the tracking algorithm. A trajectory could even mean a sequence of values relating to more than one object (for example, a difference in velocity between two objects). The basic premise underlying sparse reconstruction is that any new nominal sample can be well explained by a linear combination of samples within one of the nominal classes.

We now elaborate on the sparse reconstruction model, as it forms the basis for the invention. The T training samples from the i-th class can be arranged as the columns of a matrix $A_i \in \mathbb{R}^{n \times t}$. The dictionary $A \in \mathbb{R}^{n \times KT}$ of training samples from all K classes is then formed as follows: $A=[A_1, A_2, \ldots A_K]$. Given sufficient training samples from the m-th trajectory class, a test image $y \in \mathbb{R}^n$ from the same class is conjectured to approximately lie in the linear span of those training samples. Any input trajectory feature vector may hence be represented by a sparse linear combination of the set of all training trajectory samples as shown in Equation (1) as follows:

$$y = A\alpha = [A_1, A_2, \ldots, A_K]\begin{bmatrix} \alpha_1 \\ \alpha_1 \\ \vdots \\ \alpha_K \end{bmatrix} \quad (1)$$

where each $\alpha_i \in \mathbb{R}^T$. Typically for a given trajectory y, only one of the $\alpha_i$'s would be active (corresponding to the class/event that y is generated from), thus the coefficient vector $\alpha \in \mathbb{R}^{KT}$ is modeled as being sparse and is recovered by solving the following optimization problem:

$$\hat{\alpha} = \underset{\alpha}{\text{argmin}} \|\alpha\|_1 \text{ subject to } \|y - A\alpha\|_2 < \varepsilon \quad (2)$$

where the objective is to minimize the number of non-zero elements in $\alpha$. It is well-known from the compressed sensing literature that using $I_0$ norm leads to a NP-hard problem. Thus, the $I_1$ norm is used as an effective approximation. The residual error between the test trajectory and each class behavior pattern can be computed to determine the class per the test trajectory as shown in Equation (3) below:

$$r_i(y) = \|y - A_i \hat{\alpha}_i\|_2 \; i=1,2,\ldots,K \quad (3)$$

If anomalies have been predefined into their own class, then the classification task also accomplishes anomaly detection. Alternatively, if all training classes correspond to nominal events, then anomalies can be identified via outlier detection. To this end, an index of sparsity is defined and used to measure the sparsity of the reconstructed as indicated by Equation 4 below:

$$SCI(\alpha) = \frac{K \cdot \max_i \|\delta_i(\alpha)\|_1 / \|\alpha\|_1 - 1}{K - 1} \in [0, 1] \quad (4)$$

where $\delta_i(\alpha): \mathbb{R}^T \rightarrow R^T$ the characteristic function that selects the coefficients with respect to the i-th class. It is readily seen that nominal samples are likely to exhibit a high level of sparsity, and conversely, anomalous samples will likely produce a low sparsity index. A threshold on $SCI(\alpha)$ determines whether or not the sample is anomalous.

The aforementioned formulation applies for single-object events. This has been extended to a joint sparsity model that successfully detects anomalies involving co-occurrence of two or more events. The disclosed embodiments are applicable to both single- and multi-object events. A primary advantage of the sparsity based framework for classification and anomaly detection over other techniques is that it has been shown to be particularly robust against various distortions, notably occlusion. It has also been shown to be robust with respect to the particular features chosen, provided the sparse representation is computed correctly.

The effectiveness of this sparsity model largely depends on the structure of training data. It is true that an over-complete training dictionary A which contains most kinds of trajectories is more preferable. However, redundant information on the training dictionary will largely increase the computational complexity. In real world scenario, some normal trajectories are indeed very similar with each other. For the classification purpose, we can retain only very few of them without losing much useful information. This problem can be referred to as a branch of dictionary learning.

For ease of exposition, consider a classification problem with data from two different classes C1 and C2. Let $\{y_j^i\}$ $i=1,2,\ldots,N_j$ be the $N_j$ training samples corresponding to class $C_j$, $j=1,2$. (In this report, subscripts refer to class indices). The training samples from class $C_j$ are collected into a matrix $Y_j$, $j=1,2$. Suppose that we have the ability to create a "good" initial dictionary $A=[A_1,A_2]$, where $A_j$ corresponds to class $C_j$, $j=1,2$. Accordingly, any training sample y has a sparse representation x in terms of the dictionary A as shown in Equation (5) below:

$$\begin{bmatrix} I_1(x) \\ I_2(x) \end{bmatrix} \quad (5)$$

where $I_j(x)$ is the indicator function operating on x to extract out those components which correspond to $A_j$.

Our goal is to jointly learn dictionaries A1 and A2 which encourage samples from class Ci to be represented (with a low reconstruction error tolerance) as linear combinations of atoms (or columns) from Ai while not having any (ideally) contribution from the complementary dictionary Aj, i≠j.

The following generally outlines the approach of the disclosed embodiments:

Step 1: Dictionary Initialization

The classes in the training dictionary A can be initialized in one of two ways:

(1) Each of the (training) trajectories in class Cj, j=1,2 can be manually labeled by a human operator. This is referred to as supervised classification.

(2) Labels and hence dictionaries [A1, A2] are automatically generated on a collection of trajectories using unsupervised techniques such as trajectory clustering techniques.

Step 2: Sparse Coding within Each Class

With fixed dictionary $A_1$, $A_2$ the objective function can be minimized with respect to $x_j^i$ and can be formulated as shown in Equation (6) below:

$$\hat{x}_j^i = \underset{x_j^i}{\arg\min} \|x_j^i\|_{0/1} \text{ subject to } \|y_j^i - A_j x_j^i\|_2 < \varepsilon_1, \quad (6)$$

$$i = 1, \ldots, N, j = 1, 2$$

Instead of using the entire training dictionary A, the sparse coefficient vector xji is only recovered by the corresponding training dictionary Aj. Given sufficient training, we also seek sparsity within class. Since the sparsity within class is weaker than the sparsity among the entire dictionary, the threshold ε1 in Eq. (6) should be chosen smaller than usual cases.

Step 3: Redundant Dictionary Column Removal

In order to reduce the size of training dictionary, we remove at most one training trajectory from each class every time. It is desired to remove the training, which contributes least to the test trajectory reconstruction, if it is less than a threshold. Such training parameters can be selected according to the formulation of Equation (7) below:

$$\text{if } \min\left(\left\|\sum_{i=1}^{N_j} |\hat{x}_j^i(\lambda_j)|\right\|_1\right) < \gamma \text{ then remove column } \hat{\lambda}_j = \quad (7)$$

$$\underset{\lambda_j}{\arg\min} \left\|\sum_{i=1}^{N_j} |\hat{x}_j^i(\lambda_j)|\right\|_1$$

where $\hat{x}_j^i(\lambda_j)$ is the $\lambda_j$-th element of vector $x_j^i$, $\hat{\lambda}_j$ is the index of the training which will be removed from dictionary $A_j$.

Step 4: Discriminative Dictionary Learning

Having pruned the class dictionaries in Step 3 above, the dictionaries can now be re-optimized to ensure high discriminability between classes.

For training samples from class C1, we expect strong contributions from atoms in A1 leading to low reconstruction error bound by some E2 while simultaneously requiring little or no contribution from A.

Consequently, we would like to minimize the difference of the two reconstruction errors, weighted by a suitable parameter βj learnt from training. In addition, we also do not want A1 and A2 converge to random matrices. Therefore, we add constrains to make sure A1 and A2 have very little changes.

$$(A_1^*, A_2^*) = \underset{\bar{A}_1, \bar{A}_2}{\arg\min} \|Y_1 - \bar{A}_1 \hat{X}\|_F - \quad (8)$$

$$\lambda_1 \|Y_1 - \bar{A}_2 \hat{X}\|_F + \|Y_2 - \bar{A}_2 \hat{X}\|_F - \lambda_2 \|Y_2 - \bar{A}_1 \hat{X}\|_F$$

subject to $$\|Y_1 - \bar{A}_1 \hat{X}\|_F \le \epsilon_2, \|Y_2 - \bar{A}_2 \hat{X}\|_F \le \epsilon_3,$$

$$\|\bar{A}_1 - A_1^0\| \le \delta_1, \|\bar{A}_2 - A_2^0\| \le \delta_2$$

Where A1=[A1,0], i.e., the matrix A with A2 replaced by zeros; likewise A2=[0,A2], A10 and A20 are the initial input of A1 and A2. Steps 2-4 can be repeated until no further improvement is possible or sufficient training has been removed in step 3.

The algorithm is described for binary classification and it easily generalizes to the K-class scenario by solving K such problems. The positive term becomes: k=1K|| Yk−AkX|| F, the subtracted term in the cost function is replaced by a sum of such terms from all other classes Ci, i≠k.

Figure 2:
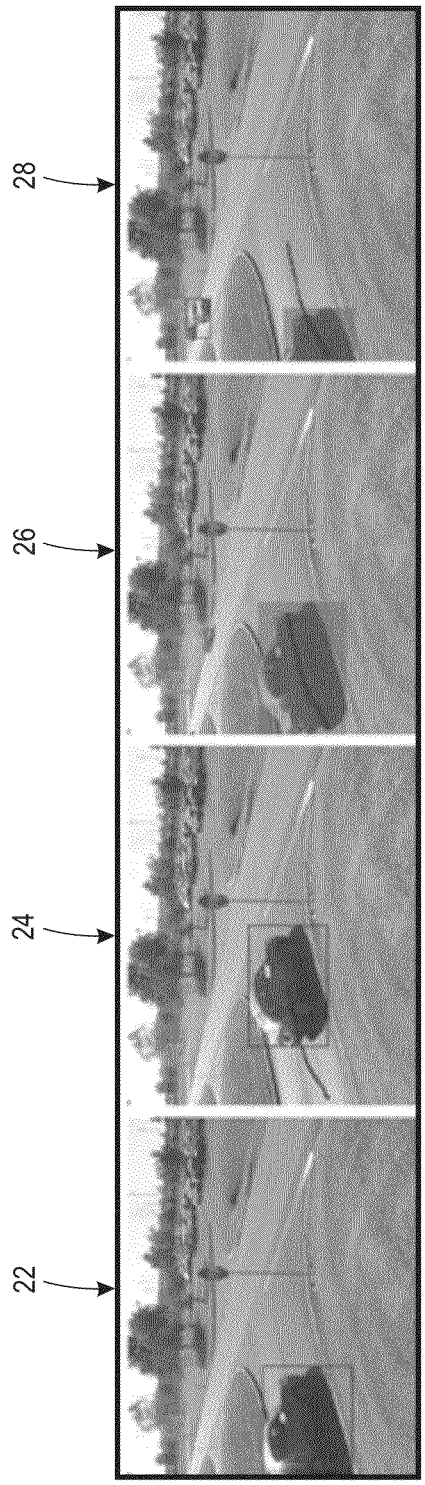
FIG. 2 illustrates a pictorial representation of analyzed stop sign data in sample video footage, which can be detected according to the disclosed embodiments.

FIG. 2 illustrates a pictorial representation of analyzed stop sign data in sample video footage, which can be detected according to the disclosed embodiments. In the example depicted in FIG. 2, a stop sign data set is utilized to evaluate the disclosed approach. This example data set includes trajectories of a car driving through a stop sign. The video footage depicted in FIG. 2 is shown via video frames 22, 24, 26, and 28. The frames 22, 24 show the car approaching the stop sign. The frames 26, 28 show the car backing through or away from the stop sign.

For simplicity, the dictionary comprises only 2 normal event classes (containing 16 trajectories each). After the discriminative dictionary learning, each class only contains 6 trajectories. Since we do not have anomalous event class, outlier rejection measure is used to identify anomalies. An independent set of 19 normal trajectories and 7 anomalous trajectories are used to test our approach.

Table I below indicates the confusion matrices from the sparsity model using the original dictionary and the sparsity model using the pruned dictionary. We observe that the new dictionary requires much less training data (37.5% of the original set), while still performing reasonably well. There is clearly a trade-off between the size of the final dictionary and the accuracy of anomaly detection, and this is a trade-off that must be tuned for a particular application.

TABLE I

Confusion Matrices on Stop Sign Data

|  | Sparsity Model (entire training) | | Learned Dictionary (with 37.5% training) | |
| --- | --- | --- | --- | --- |
|  | Normal | Anomaly | Normal | Anomaly |
| Normal | 94.7% | 14.3% | 84.2% | 14.3% |
| Anomaly | 5.3% | 85.7% | 15.8% | 85.7% |

The performance ratio (i.e., the detection rates using entire training divided by the detection rates using partial training) curves can be generated with respect to the proportion of the training used.

Figure 3:
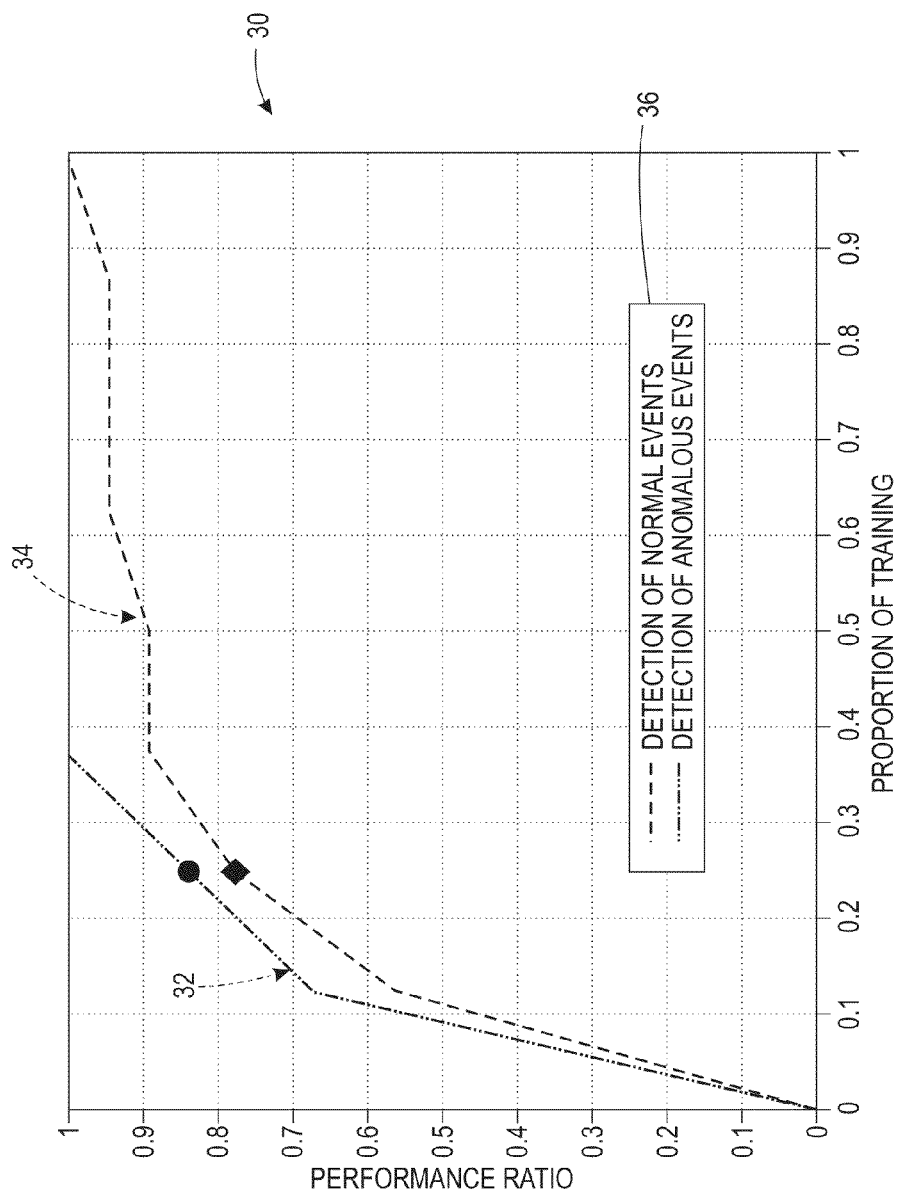
FIG. 3 illustrates a sample graph depicting ratio curves with respect to the proportion of training, in accordance with an embodiment.

FIG. 3 illustrates a sample graph 30 depicting ratio curves 32 and 34 with respect to the proportion of training, in accordance with an embodiment. A legend 36 shown in FIG. 3 indicates the detection of normal events corresponding to curve 34, and the detection of anomalous events corresponding to curves 32. FIG. 3 reveals that the discriminative dictionary learning technique disclosed herein can reduce the size of the dictionary significantly without losing much detection performance. The two points in particular demonstrate that using only 25% of training data, the system can still achieve around an 80% performance. With 38% of training samples, we find no compromise in anomaly detection performance and with only about a 10% loss in normal event detection performance.

Figure 4:
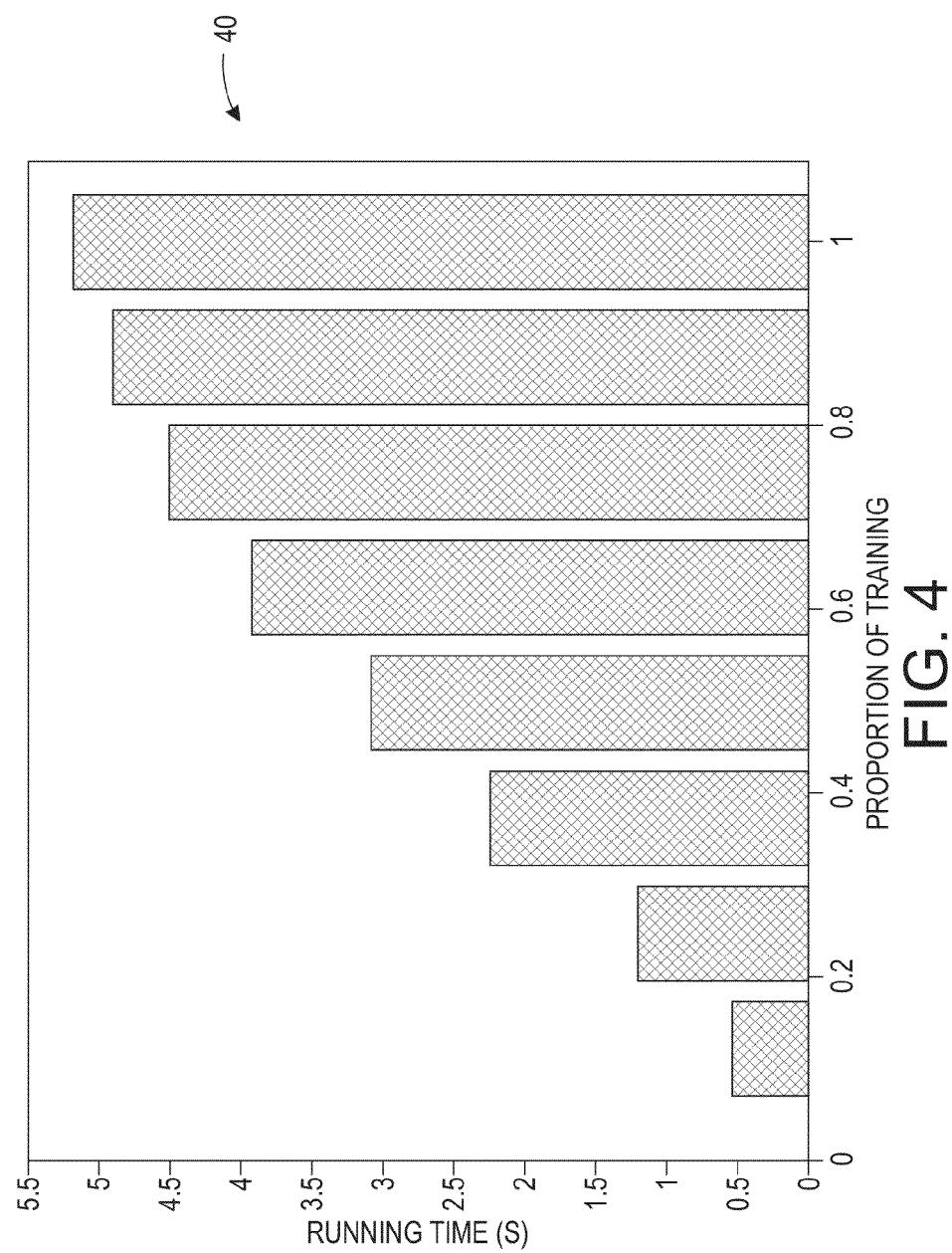
FIG. 4 illustrates a sample bar chart plotting data indicative of running time with respect to the proportion of training, in accordance with an embodiment.

FIG. 4 illustrates a sample bar chart 40 plotting data indicative of execution time as a function of the proportion of training, in accordance with an embodiment. The chart 40 shown in FIG. 4 plots data indicative of the proportion of training versus the execution time (in seconds). Based on this chart, it can be appreciated that the computational complexity reduces tremendously by decreasing the number of training samples.

Figure 5:
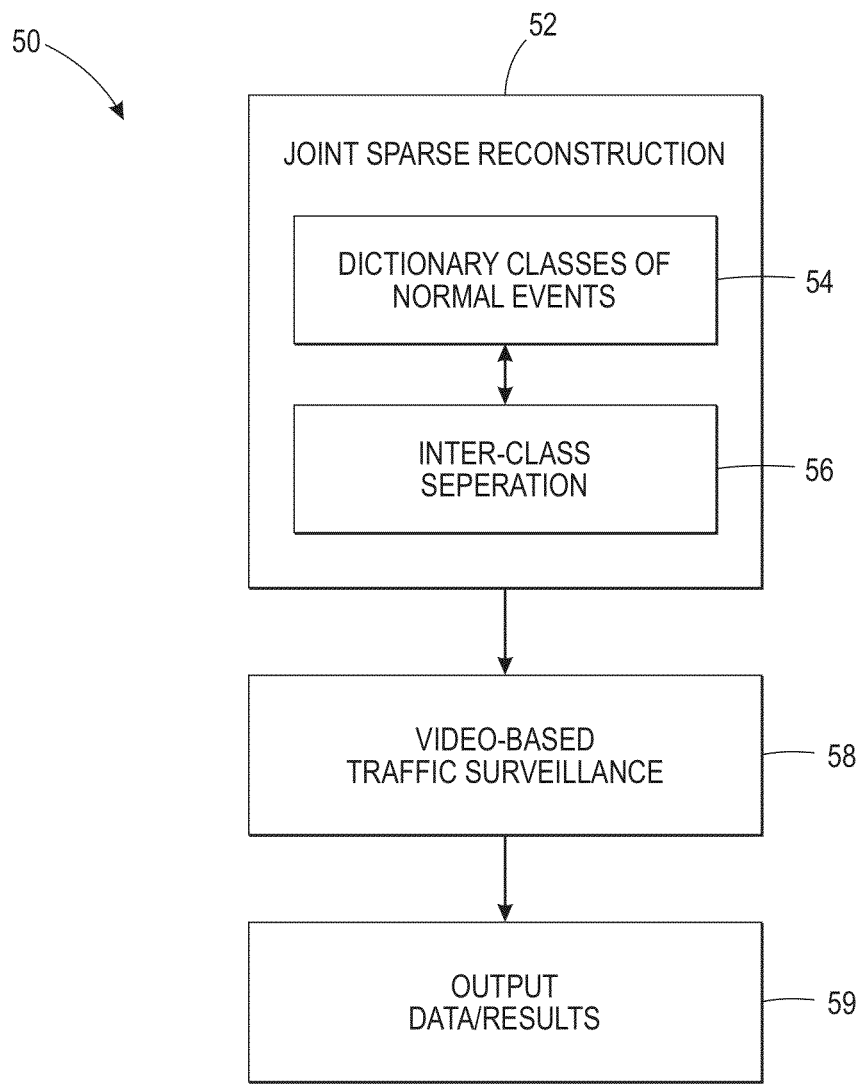
FIG. 5 illustrates a block diagram of an anomaly detection system, which can be implemented in accordance with a preferred embodiment.

FIG. 5 illustrates a block diagram of an anomaly detection system 50, which can be implemented in accordance with a preferred embodiment. System 50 detects anomalies or unusual patterns in video footage in the transportation domain (e.g., traffic violations, accidents, unsafe driver behavior, street crime, and other suspicious activities). System 50 applies to both single and joint events and is based on a sparse reconstruction model (e.g., a software module), which includes the use of a dictionary 54 comprising classes of normal events. The success of the sparsity-based approach relies upon such a dictionary 54 in association with an interclass separation module 56. After using discriminative dictionary learning technique, we can retain very few of the training examples in the dictionary 54 without losing much useful information. Therefore, the computational complexity will be reduced tremendously. System 50 can include the use of in a video-based traffic surveillance module 58 as a means of detecting and flagging unusual activities at a transportation site such as a traffic intersection, parking lot, or highway, etc. Output 59 from module 58 includes appropriate data/results with respect to identifies anomalies in, for example, a video footage.

Figure 6:
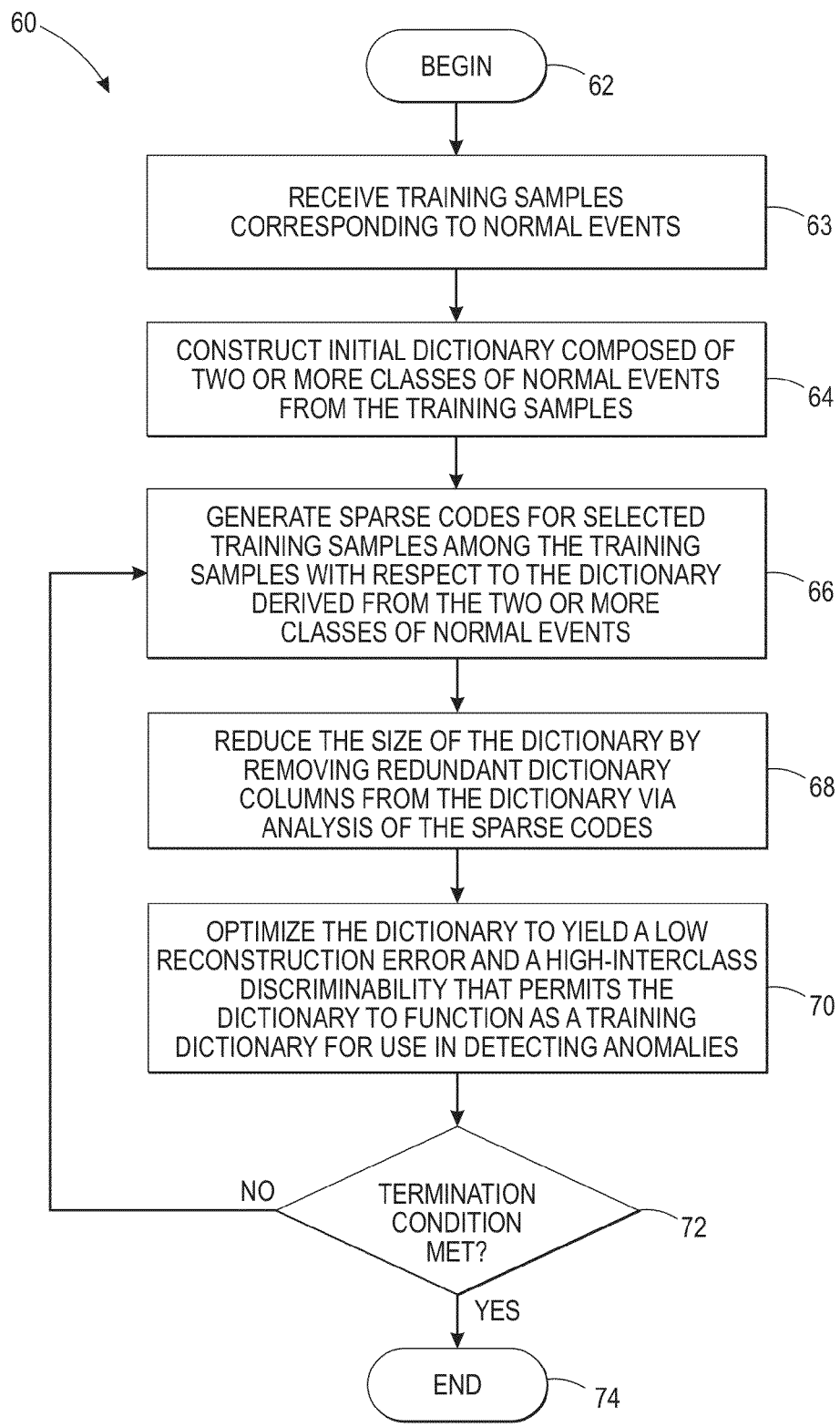
FIG. 6 illustrates a high-level flow chart of operations depicting logical operational steps of a method for the detection of anomalies in video footage, in accordance with the disclosed embodiments.

FIG. 6 illustrates a high-level flow chart of operations depicting logical operational steps of a method 60 for the detection of anomalies in video footage, in accordance with the disclosed embodiments. As indicated at block 62, the process can begin. Then, as indicated at block 63, training samples corresponding to normal events can be received. Thereafter, as illustrated at block 64, a step or logical operation can be implemented to construct a training dictionary including two or more classes of normal events from the training samples. Next, as described at block 66, a step or logical operation can be implemented for generating sparse codes for selected training samples among the training samples with respect to the dictionary derived from the two or more classes of normal events.

Thereafter, as shown at block 68, a step or logical operation can be implemented to reduce the size of the dictionary by removing redundant dictionary columns from the dictionary via analysis of the sparse codes. Next, as shown at block 70, the dictionary can be optimized to yield a low reconstruction error and a high-interclass discriminability that permits the dictionary to function as a training dictionary for use in detecting anomalies. Thereafter, as shown at block 72, a test can be performed to determine if a termination condition has been met. If so ("YES"), then the process terminates, as indicated at block 74. If not ("NO"), then the steps shown at blocks 66, 68, 70, etc., can be repeated.

Note that in some embodiments, the generating, reducing, and optimizing steps respectively shown at blocks 66, 68, and 70 can be iterated repeatedly until the dictionary is pruned to a desired size. Similarly, the generating, reducing, and optimizing steps respectively depicted in blocks 66, 68, and 70 can be itereated repeatedly until an improvement in the reconstruction error is less than a predefined threshold. In other embodiments, the generating, reducing, and optimizing steps or logical operations depicted at blocks 66, 68, and 70 can be iteratively repeated until the number of iterations reaches a predefined threshold.

As will be appreciated by one skilled in the art, the disclosed embodiments can be implemented as a method, data-processing system, and/or computer program product. Accordingly, the embodiments may take the form of an entire hardware implementation, an entire software embodiment or an embodiment combining software and hardware aspects all generally referred to as a "circuit" or "module." Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein such as, for example, the various instructions shown with respect to the method 60 illustrated in FIG. 6.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
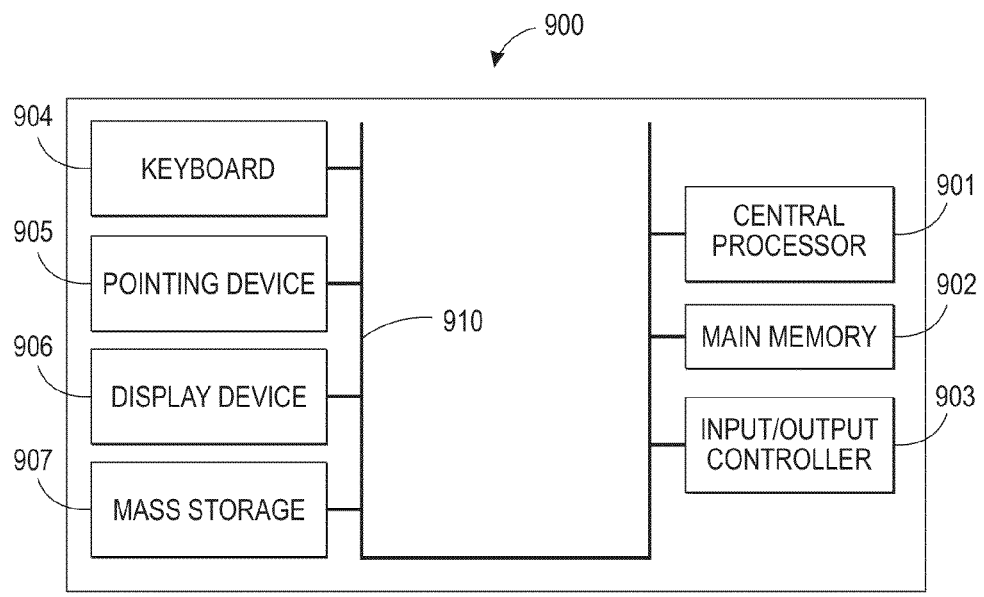
FIG. 7 illustrates a schematic view of a computer system, which can be implemented in accordance with one or more of the disclosed embodiments.
Figure 8:
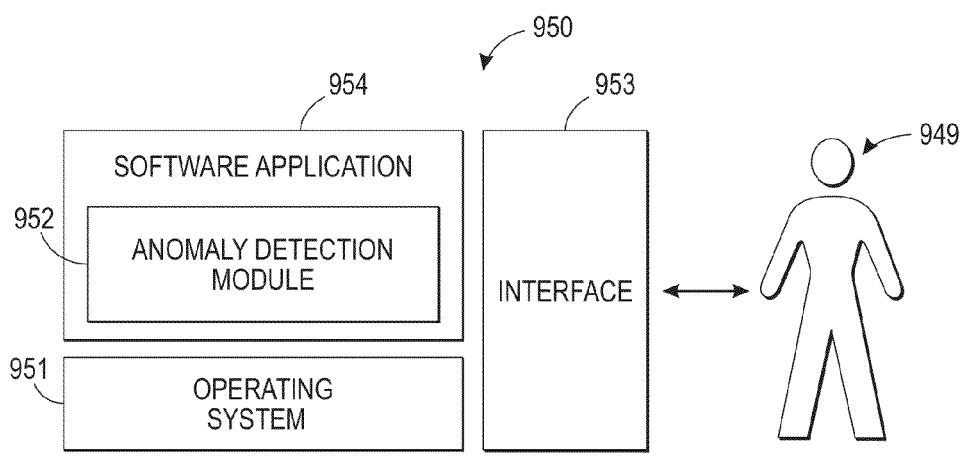
FIG. 8 illustrates a schematic view of a software system including an anomaly detection module, an operating system, and a user interface, in accordance with the disclosed embodiments.

FIGS. 7-8 are provided as exemplary diagrams of data-processing environments in which embodiments of the present invention may be implemented. It should be appreciated that FIG. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device such as a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

FIG. 8 illustrates a computer software system 950, which may be employed for directing the operation of the data-processing system 900 depicted in FIG. 7. Software application 954, stored in main memory 902 and on mass storage 907 generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 8, module 952 can be implemented as, for example, an anomaly detection module that performs, for example, the logical instructions or operations of method 60 shown in FIG. 6, or other appropriate methods/processes.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 952) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 951 and interface 953. The software application 954 can include, for example, user proximity detection module 952, which can include instructions for carrying out steps or logical operations such as those shown in FIG. 6.

FIGS. 7-8 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments, preferred and alternative, are disclosed herein. For example, in one embodiment, a method can be implemented for pruning a training dictionary for use in detecting anomalous events from surveillance video. Such a method can include the steps or logical operations of, for example, receiving a plurality of training samples corresponding to normal events, constructing a dictionary comprising two or more classes of normal events from the training samples, generating sparse codes for selected training samples with respect to the dictionary derived from the two or more classes of normal events, reducing the size of the dictionary by removing redundant dictionary columns from the dictionary via analysis of the sparse codes, and optimizing the dictionary to yield a low reconstruction error and a high-interclass discriminability.

In other embodiments, the aforementioned steps or logical operations for generating, reducing, and optimizing can be iterated repeatedly until one or more of the following conditions are met: the dictionary is pruned to a desired size, an improvement in reconstruction error is less than a predefined threshold, and the number of iterations reaches a predefined threshold.

Note that in some embodiments, the normal events can include vectors defined by trajectories of moving vehicles or persons. In still other embodiments, the dictionary can be constructed by employing a supervised approach involving a manual labeling of the two or more classes of normal events. In yet other embodiments, the dictionary can be constructed automatically using an unsupervised approach.

In some embodiments, the unsupervised approach discussed herein can include the use of a trajectory clustering technique applied to a set of training trajectories. For example, a preferred embodiment can include steps or logical operations for measuring the similarity between each pair of trajectories using either dynamic time warping, probability product kernels (e.g., such as disclosed in Jebara, 2007, Spectral clustering and embedding with hidden Markov models, ECML 2007, which is incorporated herein by reference), SC-HMM (Semicontinuous Hidden Markov Model) (e.g., such as that disclosed in Rodriguez, 2012, A Model-based sequence similarity with application to handwritten word-spotting, IEEE Trans. On PAMI, 2012, which is incorporated herein by reference) or other methods (e.g., such as disclosed in Morris, 2009, Morris 2009, Learning trajectory patterns by clustering: Experimental studies and comparative evaluation, CVPR 2009, which is incorporated herein by reference), and then applying a spectral clustering algorithm (e.g., such as disclosed in Ng 2001, On spectral clustering: analysis and an algorithm, NIPS 2001, which is incorporated herein by reference) on top of that. There are thus many possible ways to perform the data clustering algorithm. If the trajectory representation is a fixed-length feature vector, even a simple technique like k-means clustering can be employed.

In another embodiment, a system can be implemented for pruning a training dictionary for use in detecting anomalous events from surveillance video. Such a system can include, for example, a processor, a data bus coupled to the processor, and a computer-usable medium embodying computer program code, the computer-usable medium being coupled to, for example, the data bus. The computer program code can include instructions executable by the processor and configured, for example, for receiving training samples corresponding to normal events, constructing a dictionary including two or more classes of normal events from the training samples, generating sparse codes for selected training samples with respect to the dictionary derived from the two or more classes of normal events, reducing the size of the dictionary by removing redundant dictionary columns from the dictionary via analysis of the sparse codes; and optimizing the dictionary to yield a low reconstruction error and a high-interclass discriminability.

In another embodiment, a processor-readable medium storing computer code representing instructions to cause a process for pruning a training dictionary for use in detecting anomalous events from surveillance video can be implemented. Such computer code can include code to, for example, receive training samples corresponding to normal events, construct a dictionary including two or more classes of normal events from the training samples, generate sparse codes for selected training samples with respect to the dictionary derived from two or more classes of normal events, reduce the size of the dictionary by removing redundant dictionary columns from the dictionary via analysis of the sparse codes, and optimize the dictionary to yield a low reconstruction error and a high-interclass discriminability.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for pruning a training dictionary for use in detecting anomalous events from a surveillance video, said method comprising:
    receiving a plurality of training samples corresponding to normal events;
    constructing a dictionary comprising at least two classes of normal events from said plurality of training samples;
    generating a plurality of sparse codes for selected training samples among said plurality of training samples with respect to said dictionary derived from said at least two classes of normal events;
    reducing a size of said dictionary by removing at least one redundant dictionary column from said dictionary via analysis of said plurality of sparse codes; and
    optimizing said dictionary to yield a low reconstruction error and a high-interclass discriminability,
    wherein the redundant dictionary column is a column which has the least contribution to a test trajectory reconstruction and if the least contribution is less than a threshold.

2. The method of claim 1 wherein said generating, said reducing, and said optimizing are iterated repeatedly until at least one of the following conditions are met:
    said dictionary is pruned to a desired size;
    an improvement in reconstruction error is less than a predefined threshold; and
    a number of iterations reaches a predefined threshold.

3. The method of claim 2 wherein normal events comprise vectors defined by trajectories of moving vehicles or persons.

4. The method of claim 1 wherein normal events comprise vectors defined by trajectories of moving vehicles or persons.

5. The method of claim 1 wherein said constructing said dictionary further comprises employing a supervised approach involving a manual labeling of said at least two classes of normal events from said plurality of training samples.

6. The method of claim 1 wherein said constructing said dictionary further comprises automatically constructing said dictionary using an unsupervised approach.

7. The method of claim 6 wherein said unsupervised approach comprises a data clustering algorithm applied to a set of training trajectories.

8. The method of claim 1 wherein generating said plurality of sparse codes further comprises generating at least one sparse code among said plurality of sparse codes by solving an optimization problem.

9. The method of claim 1 wherein optimizing said dictionary comprises solving an optimization problem.

10. A system for pruning a training dictionary for use in detecting anomalous events from a surveillance video, said system comprising:
   a processor;
   a data bus coupled to said processor; and
   a computer-usable medium embodying computer program code, said computer-usable medium being coupled to said data bus, said computer program code comprising instructions executable by said processor and configured for:
   receiving a plurality of training samples corresponding to normal events;
   constructing a dictionary comprising at least two classes of normal events from said plurality of training samples;
   generating a plurality of sparse codes for selected training samples among said plurality of training samples with respect to said dictionary derived from said at least two classes of normal events;
   reducing a size of said dictionary by removing at least one redundant dictionary column from said dictionary via analysis of said plurality of sparse codes; and
   optimizing said dictionary to yield a low reconstruction error and a high-interclass discriminability,
   wherein the redundant dictionary column is a column which has the least contribution to a test trajectory reconstruction and if the least contribution is less than a threshold.

11. The system of claim 10 wherein said instructions for generating, reducing, and optimizing are iterated repeatedly until at least one of the following conditions are met:
   said dictionary is pruned to a desired size;
   an improvement in reconstruction error is less than a predefined threshold; and
   a number of iterations reaches a predefined threshold.

12. The system of claim 10 wherein normal events comprise vectors defined by trajectories of moving vehicles or persons.

13. The system of claim 10 wherein said instructions are further configured for constructing said dictionary by employing a supervised approach involving a manual labeling of said at least two classes of normal events.

14. The system of claim 10 wherein said instructions are further configured for constructing said dictionary automatically using an unsupervised approach.

15. The system of claim 10 wherein said instructions for generating said plurality of sparse codes further comprises instructions configured for generating at least one sparse code among said plurality of sparse codes by solving an optimization problem.

16. The system of claim 14 wherein said unsupervised approach comprises a data clustering algorithm applied to a set of training trajectories.

17. The system of claim 10 wherein said instructions for optimizing said dictionary further comprises instructions configured for solving an optimization problem.

18. A non-transitory processor-readable medium storing computer code representing instructions to cause a process for pruning a training dictionary for use in detecting anomalous events from a surveillance video, said computer code comprising code to:
   receive a plurality of training samples corresponding to normal events;
   construct a dictionary comprising at least two classes of normal events from said plurality of training samples;
   generate a plurality of sparse codes for selected training samples among said plurality of training samples with respect to said dictionary derived from said at least two classes of normal events;
   reduce a size of said dictionary by removing at least one redundant dictionary column from said dictionary via analysis of said plurality of sparse codes; and
   optimize said dictionary to yield a low reconstruction error and a high-interclass discriminability,
   wherein the redundant dictionary column is a column which has the least contribution to a test trajectory reconstruction and if the least contribution is less than a threshold.

19. The processor-readable medium of claim 18 wherein said code to generate, said code to reduce, and said code to optimize are iterated repeatedly until at least one of the following conditions are met:
   said dictionary is pruned to a desired size;
   an improvement in reconstruction error is less than a predefined threshold; and
   a number of iterations reaches a predefined threshold.

20. The processor-readable medium of claim 18 wherein normal events comprise vectors defined by trajectories of moving vehicles or persons.

* * * * *